Dec. 5, 1967     E. R. STOUT     3,356,194
SPRING CLUTCH WITH HELICAL SPLINE
Filed April 7, 1966     2 Sheets-Sheet 1
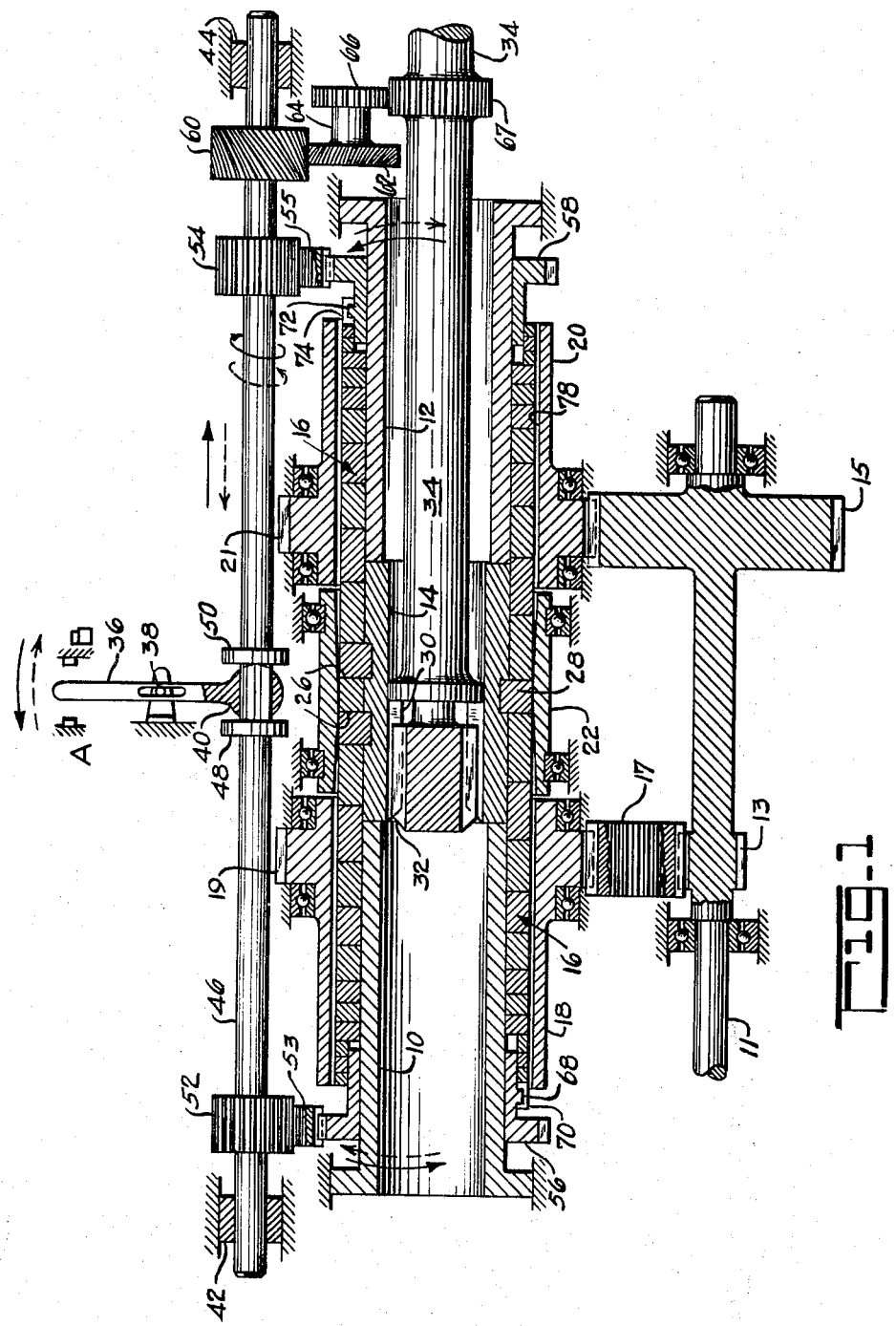
INVENTOR.
ELLARSON R. STOUT
BY
*William V. Ebs*
HIS ATTORNEY Dec. 5, 1967   E. R. STOUT   3,356,194
SPRING CLUTCH WITH HELICAL SPLINE
Filed April 7, 1966   2 Sheets-Sheet 2
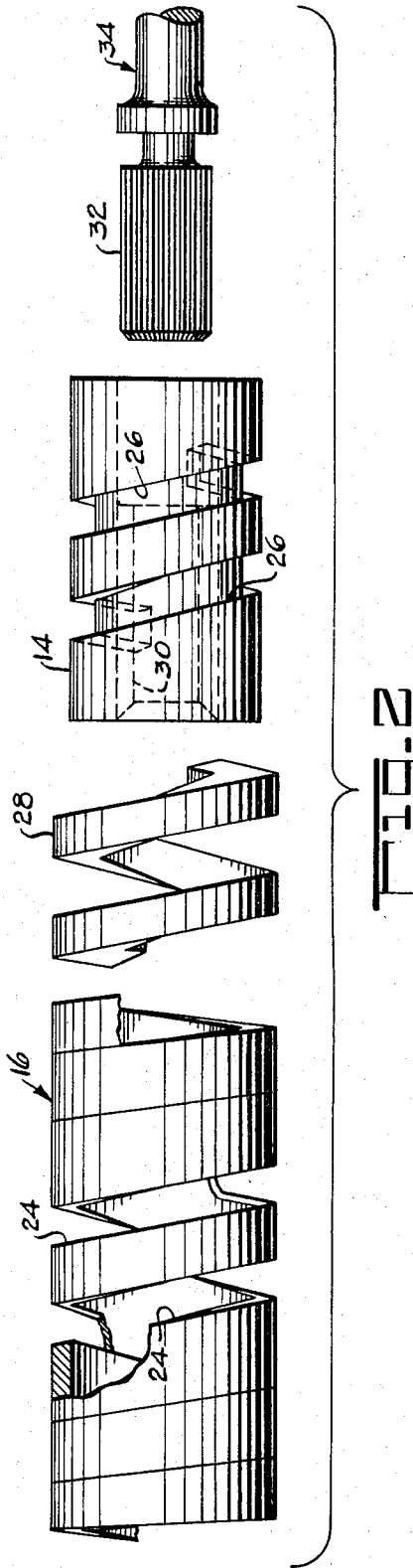
INVENTOR.
ELLARSON R. STOUT
BY
HIS ATTORNEY

United States Patent Office 3,356,194
Patented Dec. 5, 1967

3,356,194
SPRING CLUTCH WITH HELICAL SPLINE
Ellarson R. Stout, Fayson Lakes, N.J., assignor to Curtiss-Wright Corporation, a corporation of Delaware
Filed Apr. 7, 1966, Ser. No. 540,910
7 Claims. (Cl. 192—12)

My invention relates to spring clutch mechanisms and is particularly directed to means for drivably connecting a clutch spring and output clutch member.

It is an object of the invention to increase the flexibility of the driving connection between input and output members in spring clutch mechanisms.

It is another object of the invention to provide a bidirectional spring clutch mechanism having a single clutch spring connected to an output member by means of a helical spring key which is loaded in compression and thereby caused to radially expand whether the device is operated to rotate the output member in one direction or the other.

It is still another object of the invention to provide a bidirectional spring clutch mechanism having a single clutch spring operable to hold an output clutch member against rotation in one direction or another and connected to the output member in a manner enabling coils at the connection to contribute to the holding function.

Other objects and advantages of the invention will become apparent from reading the specification in connection with the accompanying drawings wherein:

FIG. 1 is a vertical longitudinal sectional view of a spring clutch incorporating the features of the invention; and FIG. 2 is an exploded top plan view of the clutch spring of FIG. 1 and drivably connected parts.

In the drawings, reference characters 10 and 12 designate fixed hollow shafts which are separated by a cylindrical rotatable member 14 in axial alignment with the shafts. The shafts 10 and 12 and rotatable member 14 are engaged by the coils of a helical spring 16 in the unactuated condition of the clutch. Input drums 18 and 20 which are coaxial with the shafts 10 and 12 and the member 14 surround opposite end portions of the spring, and a rotatable sleeve 22 also coaxial with the shafts 10 and 12 and the member 14 separates the drums axially as shown. Suitable means comprising shaft 11, gears 13 and 15 thereon, idler 17, and the gears 19 and 21 on the input drums 18 and 20, respectively, are provided for continuously rotating drum 18 in a direction to unwind underlying coils from fixed shaft 10 upon contact with the underlying end coil, and drum 20 in the opposite direction as required to unwind the underlying coils from fixed shaft 12 upon contact with the end coil.

The coils of spring 16 are of maximum width at the middle portion of the spring and taper gradually toward opposite ends of the spring to coils of minimum width. Opposite end coils of the spring 16 are reduced in thickness to facilitate actuation of the spring and clutch engagement. The spring is provided with a helical slot 24 in the widest coils, and cylindrical member 14 within the spring 16 includes a helical slot 26 which registers with the slot 24. The slots 24 and 26 contain a spring key element 28 which is substantially the same length as the slots. Member 14 includes internal splines 30 which engage external splines 32 on an output shaft 34.

The clutch is controllable as by a lever 36 which is mounted on a fixed pin 38 as shown. Rotatably mounted in a bulb formation 40 on one end of the lever 36 and in bearings 42 and 44 is a shaft 46 which includes flanges 48 and 50 that contact the bulb 40 to prevent axial movement of the shaft relative to the lever. Spur gears 52 and 54 are affixed to the shaft 46 and engage idlers 53 and 55, respectively. Idler 53 meshes with a gear 56 and idler 55 meshes with a gear 58. A helical gear 60 affixed to shaft 46 meshes with a helical gear 62 formed on a rotatable shaft 64. Spur gear 66 also formed on the shaft 64 engages a gear 67 formed on the output shaft 34.

With the lever 36 in a neutral position, as shown in FIG. 1 of the drawings, the gears 56 and 58 occupy positions wherein a spring actuating tab 68 on the gear 56 is just barely out of contact with tab 70 on one end of spring 16 and a spring actuating tab 72 on the gear 58 is just barely out of contact with tab 74 on the other end of the spring 16. The output shaft 34 is prevented from rotating while the lever is in its neutral position, since any tendency of the shaft to rotate causes member 14 to act through key 28 upon the spring 16 so as to tighten coils of the spring against one or the other of the fixed shafts 10 and 12.

Upon movement of the lever 36 in a counterclockwise direction as viewed in FIG. 1 from the neutral position to a position of engagement with abutment A, shaft 46 is caused to move to the right. Helical gear 60 reacts against helical gear 62 which is held against rotation by engagement of spur gear 66 with gear 67 on the output shaft, and a rotational movement is imparted to the shaft 46. Gear 54 acting on gear 58 through idler 55 causes tab 72 to actuate spring tab 74 whereas gear 52 acting on gear 56 through idler 53 causes tab 68 to move away from spring tab 70. Upon actuation of tab 74 by tab 72, the spring coils of reduced thickness adjacent to tab 74 are expanded into contact with input drum 20. The drum unwinds the coils of the spring surrounding fixed shaft 12 from the shaft, and enforces tight engagement of such coils with the inside drum surface 78. The spring, which is then caused to rotate with the drum 20, acts through the spring key element 28 upon member 14 and the member 14, which is splined to the output shaft 34, causes the output shaft to be rotated in the same direction as the direction of rotation of the drum. Due to the rotation of gear 67 on the output shaft and the resulting rotation of the gear train including gears 66, 62, 60, 54 and 55, gear 58 is caused to rotate and maintain tab 72 on the gear 58 in position against the spring tab 74. The coils of the spring 16 surrounding fixed shaft 12 therefore maintain tight-fitting contact with the inside surface 78 of the drum, and the input drum 20 continues to drive the output shaft 34 for as long as the lever 36 is maintained against abutment A. During such time, the coils of the spring on the fixed shaft 10 overrun. Due to the rotation of shaft 46, the gear 52 acting through idler 52 rotates gear 56 so as to maintain tab 68 on the gear out of contact with the spring tab 70.

The clutch is disengaged by moving the lever 36 to the neutral position of FIG. 1. Shaft 46 is rotated by gear 60 and the gears 52 and 54 as caused to resume the positions wherein the tabs 68 and 72 are just barely out of contact with the spring tabs 70 and 74, respectively, whereupon the coils in contact with the inside surface 78 of drum 20 contract and grip the shaft 12 to stop rotation of output shaft 34.

If lever 36 is moved from the neutral position in a clockwise direction as viewed in FIG. 1 to a position in contact with abutment B, shaft 46 is moved to the left and helical gear 60 reacts against helical gear 62 to produce rotation of shaft 46. Gear 52 acts on a gear 56 through idler 53 causing tab 68 to actuate spring tab 70, whereas gear 54 acting on gear 58 through idler 55 causes tab 72 to move away from spring tab 74. The actuation of spring tab 70 results in the spring coils of reduced thickness adjacent to tab 70 being expanded into contact with input drum 18 which then unwinds the coils of the spring on the fixed shaft 10 from the fixed shaft and enforces tight engagement of such coils with the inside surface 80 of drum 18. The spring, which is caused to rotate with the drum 18, acts through spring key element 28 upon member 14 and the member 14, which is splined to the output shaft 34, causes the output shaft to be rotated in the same direction as the direction of rotation of the drum. Gear 67 acting on the gear train including gears 66, 62 and 60 rotates shaft 46, and the gear 52 on the shaft acting through idler 53 rotates gear 56 so as to maintain tab 68 on gear 56 against tab 70 on the spring 16. The coils of the spring surrounding fixed shaft 10 therefore maintain tight-fitting contact with input drum 18, and the input drum continues to drive output shaft 34 for as long as the lever 36 is held against abutment B. The coils of the spring on fixed shaft 12 overrun. Gear 54 acting through idler 55 rotates gear 58 so as to maintain tab 72 on the gear out of contact with the spring tab 74. Moving the lever 36 back to the neutral position causes the gears 52 and 54 to resume positions with the tabs 68 and 72 just barely out of contact with spring tabs 70 and 74, respectively, whereupon the coils surrounding fixed shaft 10 contract to grip the shaft 10 and stop rotation of the output shaft 34.

Regardless of whether the clutch is operated to rotate the output shaft 34 in one direction or the other, spring key 28 is loaded in compression and power is transmitted through the length of the spring to member 14 to turn the output shaft. The effective length of the actuated coils of the spring 16 is therefore increased by the spring key for both modes of operation of the clutch, the key being expanded radially to lend flexibility to the connection between the spring 16 and member 14 when the clutch is engaged. The extent of such expansion need only be limited by rotatable sleeve 22 as required to maintain the key in the slots 24 and 26 in the spring 16 and member 14, respectively. Torque applied to the output shaft 34 while lever 36 is in a neutral position also puts the key 28 in compression. The spring 16 is actuated at one end or the other of the slot 24 in the spring, depending upon the direction of the torque and is caused to wind tightly against member 14 and fixed shaft 10 or 12. Rotation of the output shaft is thereby prevented. Regardless of the direction of the torque on the output shaft, that portion of the spring which includes the slot 24 contributes to the holding function of the spring.

Although only one embodiment of the invention has been shown and described, it will be apparent to those skilled in the art that other embodiments are also possible, and that various changes and modifications to the device illustrated may be made within the scope of the annexed claims without departing from the spirit and scope of the invention.

I claim:
1. A clutch comprising a pair of input drums rotatable in opposite directions, fixed structure, a helical clutch spring having a slot therethrough in intermediate coils and having coils extending in opposite directions from such slot in engagement with the fixed structure, a rotatable member having an axis of rotation coincident with the axis of the spring and including a slot which registers with the slot in the spring, a helical spring key located in the slots in said clutch spring and rotatable member for drivably connecting the clutch spring and rotatable member, means for actuating the coils extending in one direction from the slot in the clutch spring into engagement with one of the input drums to cause said rotatable member to be driven by such input drum through the clutch spring and key, and means for actuating the coils extending in the other direction from the slot in the clutch spring into engagement with the other input drum to cause the rotatable member to be driven by such other input drum through the clutch spring and key.

2. A clutch as defined in claim 1 including a sleeve concentric with the helical key and engageable thereby to limit radial movement of the key.

3. A clutch as defined in claim 1 including an output shaft operably connected with said rotatable member for rotation thereby.

4. A clutch as defined in claim 1 wherein the clutch spring surrounds the fixed structure, and the input drums surround the clutch spring.

5. A clutch as defined in claim 4 including a sleeve surrounding and concentric with the helical key, said sleeve being engageable by the key to limit radial expansion thereof.

6. In combination, an input drum, a tapered clutch spring having a slot therethrough in coils of maximum width and having coils of lesser width engageable with the input drum, a rotatable member having an axis of rotation coincident with the axis of the spring and including a slot which registers with the slot in the spring, a helical spring key located in the slots in said clutch spring and rotatable member for drivably connecting the clutch spring and rotatable member, and means for actuating said coils of lesser width into engagement with the input drum to cause said rotatable member to be driven by said input drum through the clutch spring and key.

7. The combination of claim 6 including fixed structure engageable by the clutch spring when out of contact with the input drum.

References Cited
UNITED STATES PATENTS

| | | | |
|---|---|---|---|
| 2,574,714 | 11/1951 | Smith | 192—41 X |
| 2,939,329 | 6/1960 | Doerries. | |
| 2,975,648 | 6/1961 | Doerries | 192—51 X |

BENJAMIN W. WYCHE, *Primary Examiner.*